United States Patent [19]
Tipton, Jr.

[11] 4,440,381
[45] Apr. 3, 1984

[54] GATE VALVE

[76] Inventor: Robert G. Tipton, Jr., Rte. 1, Macomb, Okla. 74852

[21] Appl. No.: 299,968

[22] Filed: Sep. 8, 1981

[51] Int. Cl.³ ............................ F16K 3/02; F16K 3/30
[52] U.S. Cl. ................................... 251/214; 251/327; 251/328; 251/330; 251/329
[58] Field of Search ............... 251/327, 329, 328, 214, 251/330

[56] References Cited

U.S. PATENT DOCUMENTS

| | | | |
|---|---|---|---|
| 2,869,574 | 1/1959 | Volpin | 251/327 X |
| 3,006,599 | 10/1961 | Eckert, Jr. | 251/328 X |
| 3,217,735 | 11/1965 | Stalter | 251/266 X |
| 3,504,885 | 4/1970 | Hulsey | 251/328 X |
| 3,768,774 | 10/1973 | Baugh | 251/329 X |
| 4,033,550 | 7/1977 | Wheatley et al. | 251/328 |
| 4,372,531 | 2/1983 | Rollins et al. | 251/328 X |

FOREIGN PATENT DOCUMENTS 921352 3/1963 United Kingdom ................ 251/328

Primary Examiner—Arnold Rosenthal
Attorney, Agent, or Firm—William R. Laney

[57] ABSTRACT

A gate valve which includes a body defining a cylindrical bore opening at one side of the body, and defining also a fluid flow passageway extending through the body and intersecting the cylindrical bore at a right angle. A pair of seat ring adaptors extend into the body via the opposite end portions of the fluid flow passageway, and each carries an annular pipe flange at its outer end and spaced from the body, and an annular bolting flange adjacent the body to facilitate bolting the adaptor to the body. Each adaptor carries within a counter-bore formed in its inner end inside the body, an annular seat ring. A gate is mounted for reciprocating movement within the cylindrical bore of the body and between the seat rings. A stem threadedly engages the gate and projects upwardly through an opening formed in a bonnet bolted to the body. An operating handle is secured to the opposite end of the stem from the end threadedly engaged with the gate.

10 Claims, 6 Drawing Figures

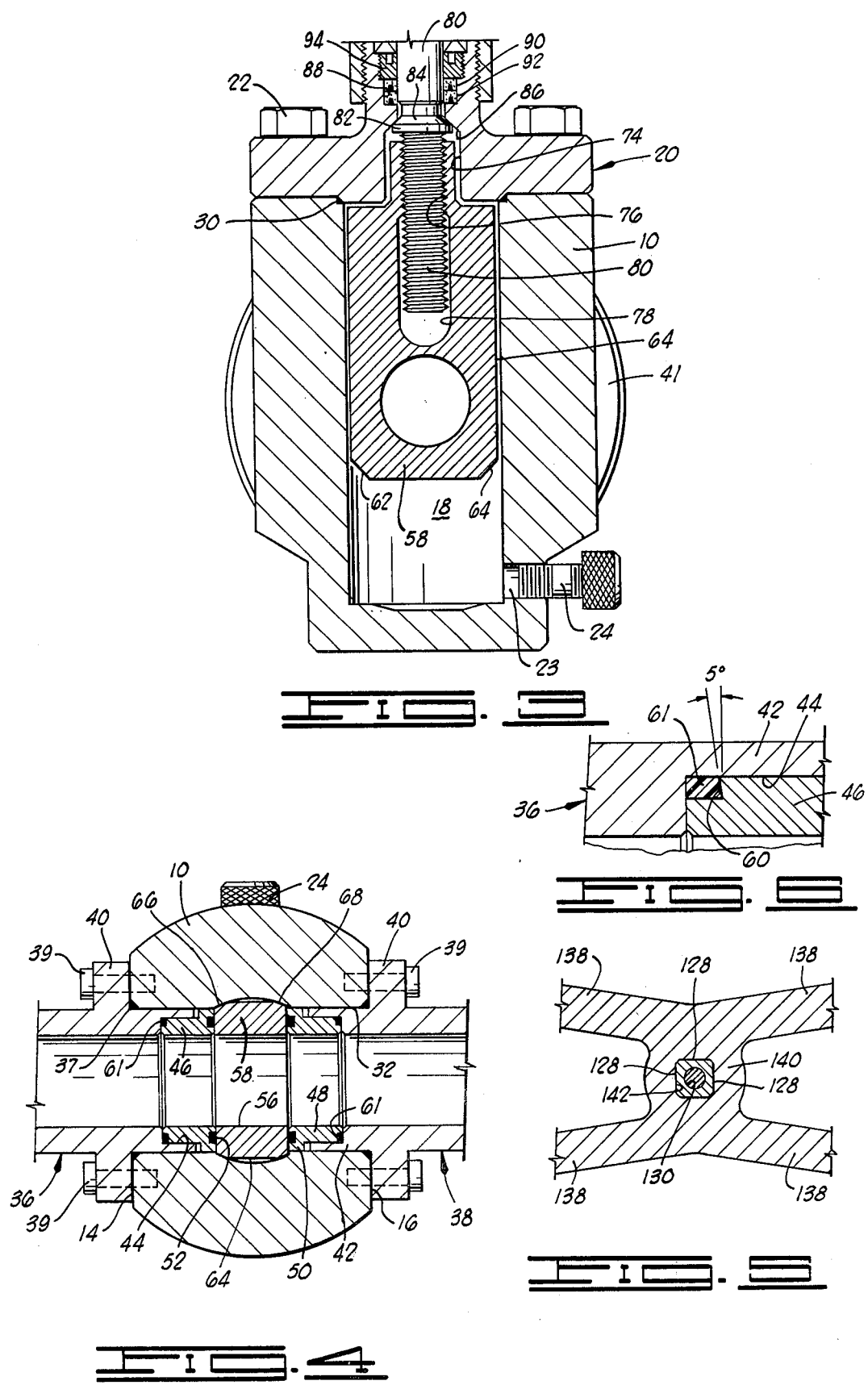

GATE VALVE

FIELD OF THE INVENTION

This invention relates to valves, and more particularly to gate valves.

BRIEF DESCRIPTION OF THE PRIOR ART

The description of the following prior art patents represents an endeavor to disclose to the Patent Examiner examining this application, such prior art as is known to Applicant, and thought to have any pertinence with respect to the present invention.

Wheatley et al. U.S. Pat No. 4,033,550 depicts a gate valve which includes a relatively flat valve body having a gate chamber formed therein. The valve gate is a flat, elongated member having opposite side edges which are guided against opposite sides of the gate chamber, without the requirement for grooves or other guiding elements into which the edges of the gate project. The gate chamber in the valve body is closed by a bolted bonnet which is secured across one side of the valve body, and a pressurized packing is disposed in a recess in the bonnet and fits tightly around a valve stem which engages the gate for actuating the gate up and down in the gate chamber. A pair of annular valve seats are seated in annular recesses formed into the valve body on opposite sides of the gate chamber, and are positioned in opposite facing alignment and at a location to contact opposite sides of the gage during its reciprocation. A fluid flow passageway is formed through the valve body in a direction normal to the gate chamber, and a pair of flange fittings are bolted to opposite sides of the valve body in alignment with the fluid flow passageway through the valve body.

In the Wheatley valve, the seat rings are not as easily accessible or as easily replaced, as are the seat rings of the present invention.

Eichenberg et al. U.S. Pat. No. 2,834,097 depicts a gate valve which has a large gate chamber disposed inside of a body to accommodate a reciprocating gate. A pair of seats are removably disposed inside the valve body and are aligned on opposite sides of the gate and bear thereagainst during reciprocation of the gate. The seats have guide strips welded to their sides to guide the gate as it moves between the seats. Line couplings are welded to protuberant portions of the valve body, and each includes a neck which is pressed into a port formed in the side of the valve body, with the line couplings disposed on opposite sides of the body in alignment with the fluid flow passageway through the body. In similarity to the gate valve of the present invention, the neck of each line coupling is inserted into one of the ports formed in opposite sides of the valve body, and thereby give greater strength to the valve under wind loading and impact conditions by distributing the alignment of forces transmitted along the valve body more evenly and fully to the line in which the valve is coupled.

In the Eichenberg et al. gate valve, a bonnet is bolted to the valve body to close the gate chamber, and a stem projects through the bonnet where it is surrounded by a pressure loaded packing carried in a bore formed in the bonnet.

A back seating feature enabling safe replacement of stem packing and bearings under full pressure conditions is characteristic of a gate valve manufactured by Foster Oil Field Equipment Company of Houston, Tex. In the Foster gate valve, the body of the valve and the bonnet which is bolted thereto are made from castings or forgings. The body, however, is made from a single structural element which includes the line flanges and couplings formed integrallay with the body.

Other gate valves of some interest with respect to the present invention, though differing widely in the constructions of a number of specific elements are U.S. Pat. No. 2,674,436 to Jones; Ripert U.S. Pat. No. 4,260,134; Wey U.S. Pat. No. 2,829,862 and Kellogg U.S. Pat. No. 2,891,762.

Volpin U.S. Pat. No. 2,869,574 is also of interest in its showing of a valve gate which is connected to a stem which has a tapered annular shoulder thereabout adapted to back seat against a tapered seat formed within the bonnet of the valve.

GENERAL DESCRIPTION OF THE INVENTION

The gate valve of this invention includes a generally cylindrical valve body having a cylindrical bore therein and a bonnet assembly which closes the bore. A gate is reciprocally mounted in the cylindrical bore and is threaddedly connected to a stem which projects through the bonnet assembly. An operator handle is keyed to one end of the stem outside the bonnet assembly. A fluid flow passageway projects through the body at a right angle to the cylindrical bore and opens at opposite sides of the body.

A pair of tubular seat ring adapter fittings are fitted into the fluid flow passageway from opposite sides of the valve body, and each carries an annular bolting flange by which the respective seat ring adapter fitting is bolted to the valve body. Each adapter fitting also carries an annular pipe flange at its outer end which facilitates bolting the gate valve in line for service. At its inner end inside the valve body, each of the tubular seat ring adaptors defines a counterbore into which a seat ring is fitted so that the two seat rings face each other across the cylindrical bore in the valve body, and are positioned for sliding engagement with opposite sides of the gate. A non-adjustable packing surrounds the valve stem and is carried in an annular recess within the bonnet assembly.

An important object of the invention is to provide a gate valve which can be used over many pressure ranges and for varying applications by the simple expedient of changing out the two seat ring adaptors which are bolted to the body of the gate valve.

Another object of the invention is to provide a gate valve having a pair of tubular seat ring adaptors defining a substantial portion of the fluid flow passageway through the valve, and which are sleeved into the valve body so as to better distribute wind loading and impact loading on the valve, and thereby extend the effective service life of the valve.

A further object of the invention is to provide a pretensioned packing around the valve stem which does not require any adjustment or variation in loading, and which facilitates reduction of frictional drag on the valve stem during operation.

An additional object of the invention is to provide an improved connection between the operator handle and the valve stem.

An advantage of the invention is that the gate valve body and its associated seat ring adapters can be machined from bar stock, eliminating any need for expensive castings or forgings.

Another advantage of the invention resides in the manner in which the valve gate and the cylindrical bore in the valve body cooperate so as to eliminate any need for gate guides.

The foregoing objects and advantages will be better understood, and additional objects and advantages will become apparent, as the following detailed description of the invention is read in conjunction with the accompanying drawings which illustrate a preferred embodiment of the invention.

GENERAL DESCRIPTION OF THE DRAWINGS

FIG. 3 is a sectional view taken along line 3—3 of FIG. 2.

FIG. 4 is a sectional view taken along line 4—4 of FIG. 2.

FIG. 5 is a sectional view taken along line 5—5 of FIG. 2.

FIG. 6 is a detail view illustrating, in section, the construction of a sealing ring groove and sealing ring utilized in the present invention.

DETAILED DESCRIPTION OF A PREFERRED EMBODIMENT OF THE INVENTION

Figure 1:
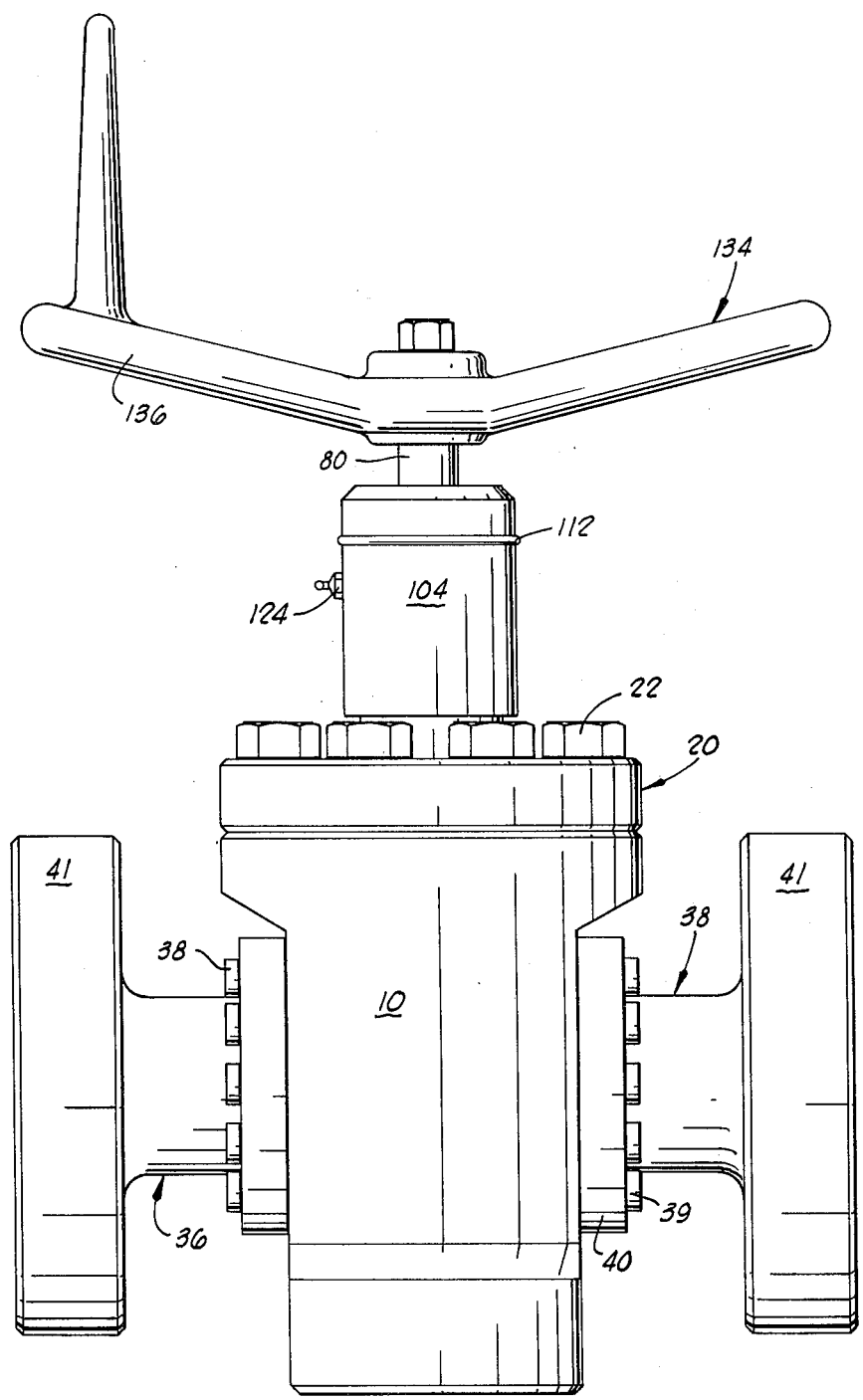
FIG. 1 is a side elevation view of a gate valve constructed in accordance with the present invention.

Referring initially to FIG. 1 of the drawings, the gate valve of the invention includes a valve body 10 which is made by machining parallel flats 14 and 16 on opposite sides of cylindrical bar stock, and by machining a cylindrical bore 18 into the body, which bore opens at one side of the body. A bonnet subassembly, designated generally by reference numeral 20, is bolted to the body 10 by means of bolts 22. At the bottom or inner end of the cylindrical bore, a lubricant passageway 23 is provided and is adapted to receive a lubricant fitting 24. At the upper end of the cylindrical bore 18 where it opens out of the valve body 10, an annular recess is cut into the body so as to define a seat for a bonnet seal ring 30.

The valve body 10 is provided with a transversely extending fluid flow passageway 32 cut through the walls of the body, and intersecting the cylindrical bore 18 at a right angle. The fluid flow passageway 32 opens at opposite sides of the body and has a tapered seal seat 34 provided around each of its openings. The fluid flow passageway 32 is of cylindrical configuration and receives a pair of tubular seat ring adapter fittings 36 and 38. The seat ring adapter fittings 36 and 38 are inserted into the fluid flow passageway 32 where it opens at opposite sides of the valve body, and are sealed at the point of junction with the valve body by an annular sealing ring 37. Each of the seat ring adapter fittings 36 and 38 is bolted to one of the flats 14 or 16 on opposite sides of the valve body by a plurality of bolts 39 which are projected through bolt holes formed in annular bolting flanges 40, one of which is carried on each of the tubular seat ring adapter fittings. At their outer ends opposite the internal ends inside the valve body 10, each of the seat ring adapters 36 and 38 carries a relatively large, annular pipe flange 41. Each of the pipe flanges 41 has a plurality of bolt holes 43 formed therethrough in circumferentially spaced relation for the accommodation of a plurality of bolts which are employed to couple the gate valve into a pipeline in conventional fashion.

At its inner end inside the valve body 10, each of the seat ring adapter fittings 36 and 38 carries an integral internal sleeve 42 which is counterbored as shown at 44 to receive an annular seat ring inserted into the counterbore. Thus, a pair of seat rings 46 and 48 are carried on the two seat ring adaptor fittings 36 and 38, and project into the cylindrical bore 18 formed in the valve body 10. Each of the seat rings 46 and 48 carries an annular flange 50 at its radially inner end within the valve body, and such annular flange is recessed or grooved to accommodate a sealing ring 52 constructed of a synthetic resin material having a low coefficient of friction. At its outer end, each seat ring has a trapezoidably cross-sectioned annular groove 60 formed at the intersection of its outer peripheral wall with its end wall. An axially facing side of the groove 60 is inclined at one angle of 5° to the axis of the seat ring as shown in FIG. 6. Each groove 60 receives a seating ring 61 which is preferably made of polytetrafluoroethylene.

Figure 2:
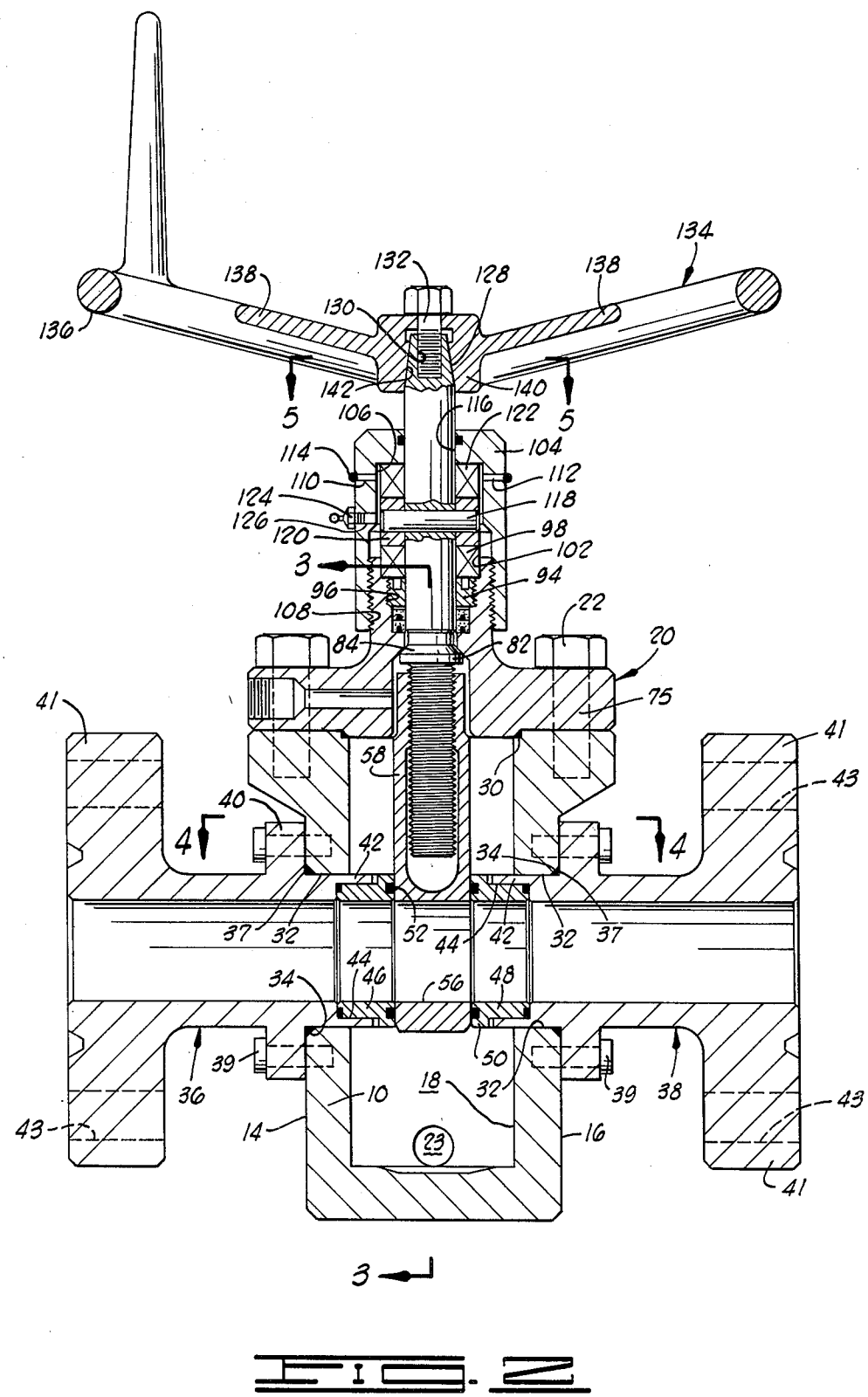
FIG. 2 is a longitudinal sectional view taken through the center of gate valve illustrated in FIG. 1.

As will be perceived in referring to FIG. 2, the seat rings 46 and 48 are aligned with each other on opposite sides of the cylindrical bore 18 formed in the valve body 10. The seat rings 46 and 48 are positioned for precise alignment with a large fluid flow opening 56 formed through a valve gate 58 which is reciprocably mounted in the valve body, and is sealingly engaged on its opposite sides by the seat rings. The gate 58 defines tapers or bevels 62 and 64 at the lower ends of the opposite sides thereof to facilitate lubricant movement into the lower portion of the cylindrical bore 18 for a purpose hereinafter described. The side edges of the gate 58 have flat surfaces 64 disposed between two radiused portions 66 and 68 which are radiused to mate with the cylindrical wall of the cylindrical bore 18. This provides channels through which lubricant may move along the side edges of the gate.

The upper end of the gate 58 is of lesser transverse thickness than its lower end so that the upper end of the gate can extend into a cylindrical bore 74 formed in a bonnet 75 forming a part of the bonnet subassembly 20. The upper end portion of the gate 58 is also provided with a threaded bore 76 which projects downwardly into the gate, and intersects a larger diameter counterbore 78.

The bore 76 and counterbore 78 accommodate and receive the lower end of a threaded valve stem 80. The stem 80 has a rib 82 formed therearound which is provided with a tapered seating surface 84 which is configured to mate with, and seat against, an inwardly and upwardly tapering seating surface 86 formed within the bonnet 75. Above the tapered surface 86 in the bonnet 75, the bonnet is provided with an annular recess 88 for the accommodation of a pair of non-adjustable packing rings 90 and 92. The packing rings surround and pack off the valve stem 80 at this point. A packing nut 94 is threaded into a recess 96 in the bonnet 75 above the packing rings 90 and 92 and retains the packing rings in their sealing positions. A thrust bearing 98 is seated in a relatively large counterbore 102 which opens into the upper end of the bonnet 75.

The upper end of the bonnet 75 is closed by a collar 104. The collar 104 includes an internal bore 106 which intersects a counterbore 108. The counterbore 108 is threaded over a substantial portion of its length to facilitate engagement with external threads carried on the outer upper end portion of the bonnet 75. The collar 104 has a pair of radial grease relief ports 110 and 112 which extend through the collar to intersect the bore 106. The radial relief ports 110 and 112 intersect at their outer ends, a circumferential groove formed around the outer side of the collar 104 for the accommodation of an O-ring sealing and venting element 114. The collar 104 has a large central opening 116 formed through the upper end thereof to accommodate passage therethrough of the valve stem 80.

At a location within the collar 104, a pin 118 projects diametrically through the center of the stem 80 and passes, at its outer ends, into accommodating cavities in a thrust ring 120. A thrust bearing 122 is positioned around the stem 80 between the thrust ring 120 and the upper end of the collar 104. In order to facilitate lubrication of the gate valve, a suitable grease fitting 124 is tapped into a radial port 126 which passes through the side of the collar 104 opposite the location of the thrust ring 120.

The upper end of the valve stem 80 is machined to provide a square cross-section or, stated differently, to alter the cylindrical configuration of the stem to a frusto-pyramidally shaped configuration. Thus, the stem has four converging planar side surfaces 128. A bore 130 is formed in the top of the stem for receiving a threaded hand wheel bolt 132. The hand wheel bolt 132 functions to retain a hand wheel, designated generally by reference numeral 134, on, and keyed to, the upper end of the stem 80. The hand wheel 134 is provided with a hand wheel ring 136 at its outer periphery which is connected by a plurality of spokes 138 to a central hub 140. The central hub 140 is generally cylindrical in configuration, and has a frusto-pyramidally shaped cavity 142 formed therein which is dimensioned to closely receive, and register with, the frusto-pyramidal upper end portion of the stem 80. The cavity 142 is limited in depth to provide a wall to support the head of bolt 132. This construction eliminates the need to provide a thrust washer between the head of the bolt 132 and the hub 140 of the hand wheel 134.

In the use and operation of the gate valve of the invention, the valve is placed in a fluid flow line or pipe by bolting the annular pipe flanges 41 carried on the seat ring adapters 36 and 38 to mating flanges formed on pipe ends in the line. The gate valve is then operated to open and close fluid flow through the pipeline by rotating the operator hand wheel 134 to cause the stem 80 to rotate and the gate 58 to be threaded upwardly or downwardly relative to the threaded lower end of the stem. When the gate is threaded downwardly on the stem 80, the opening 56 through the gate moves into the lower portion of the valve body 10 and the gate blocks the fluid flow passageway 32 through the valve body. At this time, the sides of the gate are in sealing contact with the sealing elements 52 carried on each of the seat rings 46 and 48, and the cylindrical body cavity can be bled.

To open the valve, the rotation of the operator hand wheel 134 is reversed so that the gate 58 is threaded upwardly on the stem 80 until the opening 56 in the gate is aligned with the openings through the seat rings 46 and 48. The body cavity 18 can also be bled at this time.

It will be noted, of course, that the seat ring adapters 36 and 38 are bolted to the flats 14 and 16 at the opposite sides of the valve body 10. Thus, the seat ring adapters 36 and 38 can be easily disconnected from the valve body. This enables an important advantage of the invention to be realized in that the seat ring adapters can quite easily be changed so as to change the size of the annular pipe flanges 41 and thus change the size of the pipeline into which the gate valve can be coupled. Moreover, seat ring adapters constructed of different types and hardnesses of metal can be changed out on the same valve body for different types of service. Further, the seat rings 46 and 48 can themselves be easily removed from the inner ends of the seat ring adapters when they become worn or abraded. This can be accomplished either by removing the seat ring adapters, or by removing the bonnet assembly 20 and gate 58.

The elongated sleeves 42 of the seat ring adapters, in projecting well into the valve body 10 in a close fit within the fluid flow passageway 32 therethrough, enable achievement of an even distribution of stresses imparted by heavy wind or impact loading upon the valve body to the seat ring adapters and to the line into which the gate valve is placed. This may be a very important consideration at times when several of the gate valves are placed in juxtaposition and in alignment, as in a wellhead christmas tree arrangement where a relatively high moment of force may be imposed upon gate valves which are located relatively low in the "tree" and are subjected to high moments of force developed by wind loading on the extensive vertical structure in which they are located.

The construction of the gate valve of the invention enables both the body of the valve and the seat ring adapters to be machined from readily obtained steel bar stock, instead of the use of expensive castings and forgings. Moreover, a single valve body can be utilized for several different working pressures merely by assembling the appropriate seat ring adapters to the valve body with the correct flange sizes and pressure ratings characterizing such adapters. Also, by constructing the valve by machining flats on opposite sides of cylindrical bar stock to form the exterior of the valve body, bolting of the seat ring adapters to the valve body is facilitated, and expensive and time consuming welding procedures are obviated without sacrifice of aibility to meet API specifications.

The modular construction of the gate valve enhances manufacturing and assembly processes, as well as inventory control techniques.

The employment of the pre-stressed, non-adjustable packing rings 90 and 92 avoids the considerable frictional drag which is encountered in the rotation of the valve stem in prior types of valves in which the packing rings are heavily loaded in compression when the valve is assembled and is in operation. The ease with which the gate can be reciprocated in the valve body is further enhanced by the radial constriction, upon loading, of the sealing rings 61, which are welded in such constriction by the trapezoidal cross-sectional configuration of the grooves 60.

In the event the flanges and the run of the valve are damaged by corrosion or erosion due to entrainment of grit or the like in the fluid passing through the valve, the seat ring adapters can be easily replaced, along with the seat rings, thereby restoring the valve to its original condition.

By shaping the edges of the gate to conform to and be guided in the cylindrical body cavity 18, the requirement for gate guides or grooved body walls is eliminated.

Finally, the provision of the rib or shoulder 82 on the stem 80 and its associated beveled seat 84 enable the valve to be backseated by backing the stem 80 upwardly from the gate 58 until the seating surface 84 contacts the mating seating surface 86 in the bonnet subassembly 20.

This permits the packing rings 90 and 92 to be replaced, along with the thrust bearings 98 and 122 and thrust ring 120, without interrupting or terminating service through the valve. The backseating feature also affords a safety feature in the event there is some sudden failure of one or both of the seat rings 46 and 48.

From the foregoing description, it will be perceived that the present invention provides an improved gate valve having wide versatility of utilization, simplicity of construction, and a long service life. Although a preferred embodiment of the invention has been herein described in order to illustrate the basic principles which underlie the invention, it will be understood that various changes and modifications in such preferred embodiment can be made without departure from the basic principles of the invention. Changes and innovations of this type are therefore deemed to be circumscribed by the spirit and scope of the invention except as the same may be necessarily limited by the appended claims, or reasonable equivalents thereof.

What is claimed is:

1. A gate valve comprising:
    a valve body defining a cylindrical bore opening at one side of the body, and further defining a fluid flow passageway extending through the body and intersecting the cylindrical bore at a right angle;
    a pair of tubular seat ring adapters, each of which includes a sleeve portion, and wherein the sleeve portions are extended into the valve body at opposite sides thereof, and are bored at the inner end thereof to form valve seat ring shoulders, each of said seat ring adapters further including:
        an annular pipe flange at its outer end adapted for coupling the gate valve into a pipe line; and
        an annular second flange between the pipe flange and the respective adapter sleeve portion, and adjacent the valve body;
    means fastening said second flanges of said seat ring adapters to opposite sides of the valve body;
    a pair of aligned annular valve seat rings within the valve body on opposite sides of said cylindrical bore and aligned with said fluid flow passageway, each of said seat rings seated in the bore of one of said sleeve portions against the respective seat ring shoulder;
    a gate reciprocably disposed in said cylindrical bore and having:
        opposite sides slidably contacting said seats; and
        side edges slidably contacting opposite sides of said cylindrical bore;
    a bonnet assembly fastened to said body and closing the opening of said cylindrical bore;
    a valve stem projecting through said bonnet and having a first end threadedly engaging said gate, and projecting through said bonnet, and having a second end, and a portion of frusto-pyramidal configuration adjacent said second end; and
    an operator handle connected to the second end of said stem from the end thereof engaging said gate, said operator handle including a hub portion having a cavity therein of frusto-pyramidal configuration, said cavity receiving said stem portion of frusto-pyramidal configuration with said stem portion of frusto-pyramidal configuration extending less than the total distance from one side of said hub to the other along the axis of said stem and having a space defined between the second end of said stem and the bottom of said frusto-pyramidal cavity, whereby said cavity bottom forms a wall against which a part of a fastening member connected to said stem can be abutted when said fastening member is extended into said stem through the second end thereof and is placed in tension.

2. The gate valve as defined in claim 1 wherein said valve body is further characterized in including a pair of flat, parallel surfaces on opposite sides of the body and each lying in a plane extending parallel to the axis of said cylindrical bore; and
    wherein said fastening means comprises bolts extending through said second flanges into said valve body.

3. The gate valve as defined in claim 1 wherein said bonnet assembly includes:
    a bonnet having one side bolted to said body and defining an annular recess;
    uncompressed, non-loaded packing means in said recess and sealingly surrounding said stem; and
    a packing nut retained in said bonnet adjacent said packing means.

4. A gate valve comprising:
    a valve body having a cylindrical bore for the accommodation of a reciprocating gate and a fluid flow passageway therethrough extending perpendicular to the cylindrical bore, and said valve body further including a pair of parallel flat surfaces disposed on opposite sides thereof;
    a pair of auxially bored tubular seat ring adapters each having a first end portion adapted for connection to a pipe end, a cylindrically counterbored second end portion having a counterbore therein axially aligned with the axial bore through the tubular seat ring adapter and forming a shoulder therein, said second end portion adapted to removably receive in said counterbore, a valve seat ring, and means between the first and second end portions abutting flatly against one of said flat surfaces and removably connected to said valve body;
    a pair of seat rings each received in the counterbore in the second end portion of one of said seat ring adapters, and each projecting out of said counter bore into the cylindrical bore through said valve body, each of said seat rings defining an annular sealing ring groove of trapezoidal cross-sectional configuration located adjacent the inner end of said counterbore, said annular sealing ring groove having a defining side spaced axially from said shoulder and extending at an acute angle to a plane projected perpendicular to the axis of said fluid flow passageway, said seat rings being aligned with each other and facing each other across said cylindrical bore;
    a resilient, compressible synthetic resin sealing ring in each of said sealing ring grooves, and each compressed axially between a respective one of said adapters and the respective seat ring received in the counter bore in the second end portion of the respective one of said adapters, and also compressed radially inwardly by the trapezoidal confiiguration of said sealing ring grooves;
    a gate movably mounted in said cylindrical bore for sliding contact with said seat rings;
    a bonnet assembly fastened to said body and enclosing said cylindrical bores; and
    means projecting through said bonnet assembly and engaged with said gate for moving the gate between an open position and a closed position.

5. Claim 4 wherein said bonnet assembly includes floating packing rings surrounding said means for moving the gate between an opened and closed position.

6. Claim 4 wherin said means between said first and second end portions of each of said seat ring adapters comprises a flange; and
wherein said valve is further characterized as including bolts bolting said flange to said valve body.

7. Claim 4 wherein said means for moving the gate comprises valve stem having handle means on one end thereof; and
wherein said valve is further characterized as including means for preventing fluid flow into said bonnet assembly when said valve is closed.

8. A gate valve comprising:
a valve body defining a cylindrical bore opening at one side of the body, and further defining a fluid flow passageway extending through the body and intersecting the cylindrical bore at a right angle;
a pair of tubular seat ring adapters, each of which includes a sleeve portion, and wherein the sleeve portions are extended into the valve body at opposite sides thereof, and are bored at the inner end thereof to form valve seat ring shoulders, each of said seat ring adapters further including:
an annular pipe flange at the outer end of the respective adapter adapted for coupling the gate valve into a pipeline; and
an annular second flange between the pipe flange and the respective adapter sleeve portion, and adjacent the valve body;
means fastening said second flanges of said seat ring adapters to opposite sides of the valve body;
a pair of aligned annular valve seat rings within the valve body on opposite sides of said cylindrical bore and aligned with said fluid flow passageway, each of said seat rings seated in the bore of one of said sleeve portions against the respective seat ring shoulders;
a gate reciprocably disposed in said cylindrical bore and having:
opposite sides slidingly contacting said seats; and
side edges slidably contacting opposite sides of said cylindrical bore;
a bonnet assembly fastened to said body and enclosing the opening of said cylindrical bore, said bonnet assembly including:
a bonnet having one side bolted to said body and defining an annular recess;
uncompressed, non-loaded, pre-stressed, non-adjustable packing ring means in said recess and sealingly surrounding said stem;
a packing nut retained in said bonnet adjacent said packing ring means and spaced from said packing ring means; and
a collar removably connected to the bonnet on the opposite side of the bonnet from its side bolted to said body;
a valve stem having an end threadedly engaging said gate, and the remainder of said stem passing through said bonnet; and
an operator handle connected to the opposite end of said stem from the end thereof engaging said gate.

9. A gate valve comprising:
a valve body defining a cylindrical bore opening at one side of the body, and further defining a fluid flow passageway extending through the body and intersecting the cylindrical bore at a right angle;
a pair of tubular seat ring adapters, each of which includes a sleeve portion, and wherein the sleeve portions are extended into the valve body at opposite sides thereof, and are bored at the inner end thereof to form valve seat ring shoulders, each of said seat ring adapters further including:
an annular pipe flange at its outer end adapted for coupling the gate valve into a pipe line; and
an annular second flange between the pipe flange and the respective adapter sleeve portion, and adjacent the valve body;
means fastening said second flanges of said seat ring adapters to opposite sides of the valve body;
a pair of aligned annular valve seat rings within the valve body on opposite sides of said cylindrical bore and aligned with said fluid flow passageway, each of said seat rings seated in the bore of one of said sleeve portions against the respective seat ring shoulder;
a gate reciprocably disposed in said cylindrical bore and having:
opposite sides slidably contacting said seats; and
side edges slidably contacting opposite sides of said cylindrical bore;
a bonnet assembly fastened to said body and closing the opening of said cylindrical bore, said bonnet assembly including:
a bonnet having a central opening therethrough adapted to accommodate passage through said central opening of a valve stem; and
said bonnet further having a seat surface formed therein at the end of said opening through the bonnet which is nearest said gate;
a valve stem having an end threadedly engaging said gate, and projecting through the central opening in said bonnet, said valve stem further including a bevel seat formed therearound adjacent said seat surface for back seating against said seat surface at a time when said valve is open to fluid flow through said fluid flow passageway; and
an operator handle connected to the opposite end of said stem from the end thereof engaging said gate.

10. The gate valve as defined in claim 9 wherein said gate includes flat surfaces along the opposite side edges thereof extending parallel to the axis of said cylindrical bore and each located between a pair of radiused portions of said gate in mating contact with the wall of said cylindrical bore.

* * * * *